INVENTOR:
William A. McCormick, Jr.
BY Connolly and Hutz
ATTORNEYS

Jan. 17, 1967  W. A. McCORMICK, JR  3,298,138
APPARATUS FOR DEFLASHING MOLDED RESILIENT PIECES
Filed Feb. 24, 1964  6 Sheets-Sheet 5

INVENTOR
William A. McCormick, Jr.
BY Connolly and Hutz
ATTORNEYS

United States Patent Office 3,298,138
Patented Jan. 17, 1967

3,298,138
APPARATUS FOR DEFLASHING MOLDED
RESILIENT PIECES
William A. McCormick, Jr., Hagerstown, Md., assignor to The Pangborn Corporation, Hagerstown, Md., a corporation of Delaware
Filed Feb. 24, 1964, Ser. No. 346,837
10 Claims. (Cl. 51—13)

The present invention relates to an apparatus for removing trimmings, flashings, fins, etc. from molded resilient pieces particularly those pieces molded or otherwise formed from rubber.

Such an apparatus is disclosed in U.S. Patent No. 3,110,983. In that patent, a freezing medium is used to freeze the flash or trimming, prior to the removal of the trimming. This medium is generally identified as liquid $CO_2$, pulverized Dry Ice, liquid nitrogen or other suitable freezing medium. In the body of the description, $CO_2$ is called for. In any event, the apparatus and method only contemplate using one freezing medium applicator as is shown in the drawings and explained in the description. As mentioned above, $CO_2$ is employed in the description.

Application of liquid nitrogen as the cooling medium in mechanically deflashing rubber goods molded of silicone, natural rubber, or any cold temperature resistant synthetic compounds has generally been inefficient, costly, and in many instances impractical. The major disadvantage arises from the fact that liquid nitrogen, when ejected at nominal storage container pressure through a header or distribution nozzle arrangement, tends to vaporize almost immediately, thereby giving up its refrigerant capabilities before coming in contact with the rubber goods to be frozen.

This tendency of liquid $N_2$ can be overcome by utilizing a dual cooling injection system wherein liquid nitrogen and liquid carbon dioxide are simultaneously injected through separate distribution systems on the rubber goods.

It is therefore a primary object of the present invention to provide a simultaneous injection system which offers two benefits that make the use of liquid $N_2$ practical and efficient:

(1) The injection of liquid $CO_2$ provides an atmosphere of approximately $-100°$ F. into which liquid $N_2$ is being injected. This extremely cold atmosphere greatly reduces the tendency of the liquid $N_2$ to vaporize after ejection from the distribution system.

(2) The liquid $N_2$ (at approx. $-300°$ F.) coming in contact with the $CO_2$ snow generated by the injection of liquid $CO_2$ through its distribution system will sub-cool the snow below its normal $-100°$ F. (approx.). This sub-cooled snow covers the rubber parts, providing immediate and effective solid to solid heat transfer, greatly expediting the time required to embrittle the rubber parts as necesary for mechanical deflashing.

Other objects and advantages of the invention will become more apparent from a study of the following description and drawings wherein.

Figure 1:
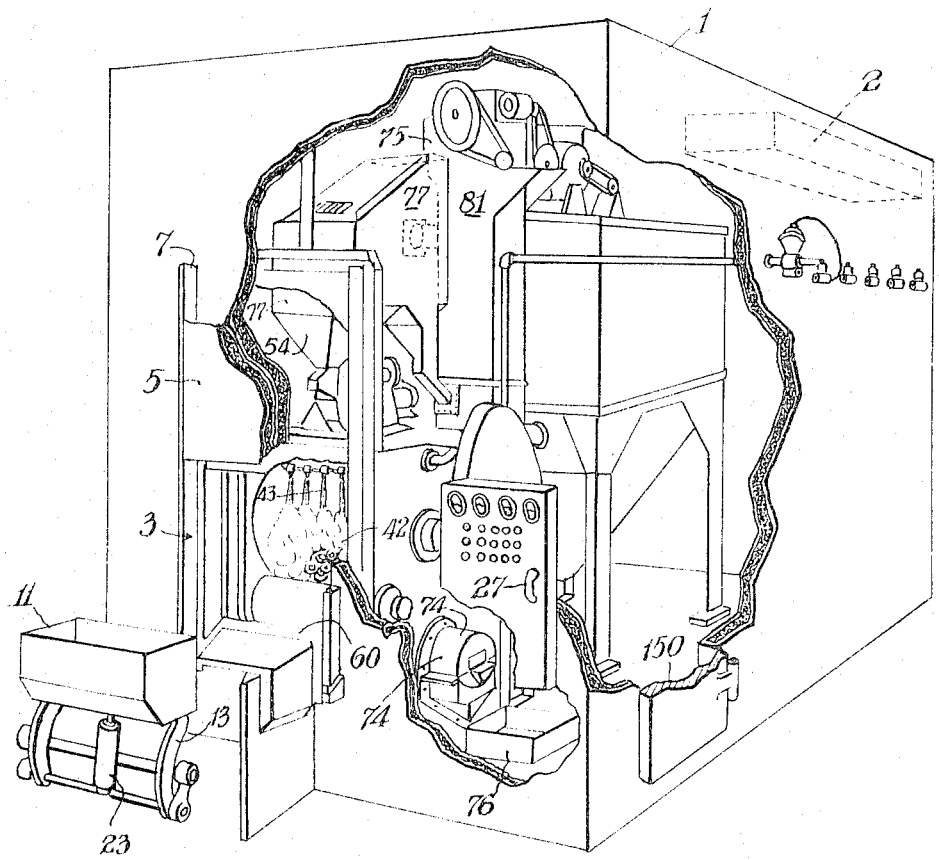
FIGURE 1 is a perspective partially broken away of the overall apparatus of the present invention.

Referring now to FIGURES 1 through 5, which show the general makeup of the apparatus, an overall housing 1 is provided and serves as a dehumidifying or refrigeration chamber in which the operating units of the apparatus are housed. As shown better in FIGURES 1 and 4, the housing 1 has formed heavy walls. The wall panels are preferably formed of inner and outer sheets of plywood which form a sandwich structure with insulation such as Fiberglas positioned between the plywood sheets. The exterior of the housing 1 is clad with galvanized steel backers or sheets. A refrigeration evaporator 2 is supported in the upper right hand corner of the housing (see FIG. 1).

In the front wall of the housing, there is a loading and unloading doorway 3 for loading and removing the rubber parts from within the housing 1. As seen better in FIGURES 1–3, the door 5 of the housing 1 is raised and lowered in tracks 7 by the hoisting mechanism generally indicated at 9 to expose and close off doorway 3.

Figure 3:
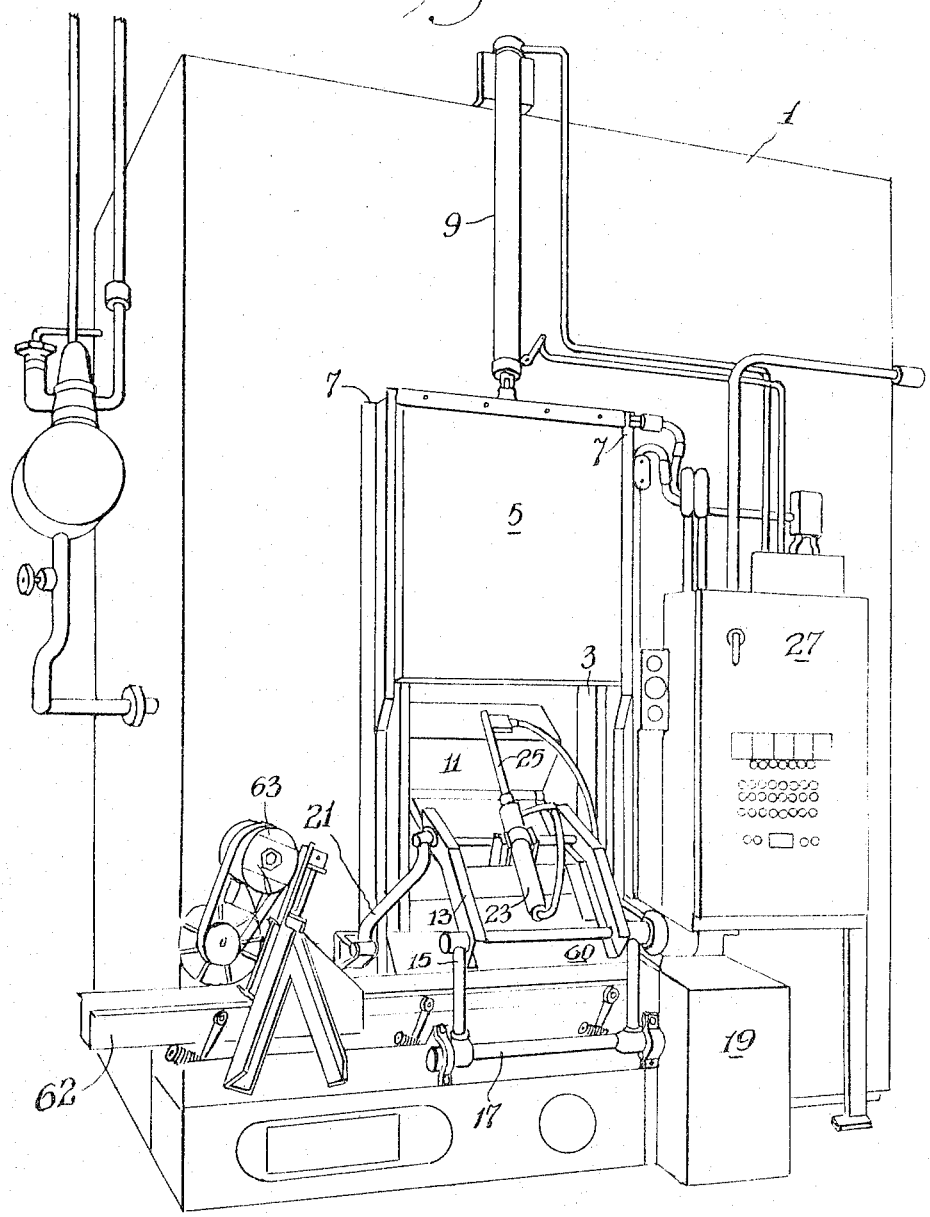
FIGURE 3 is a view similar to that of FIGURE 2 showing the door to the housing of the apparatus in raised position and with the rubber piece loader mechanism in loading position.
Figure 4:
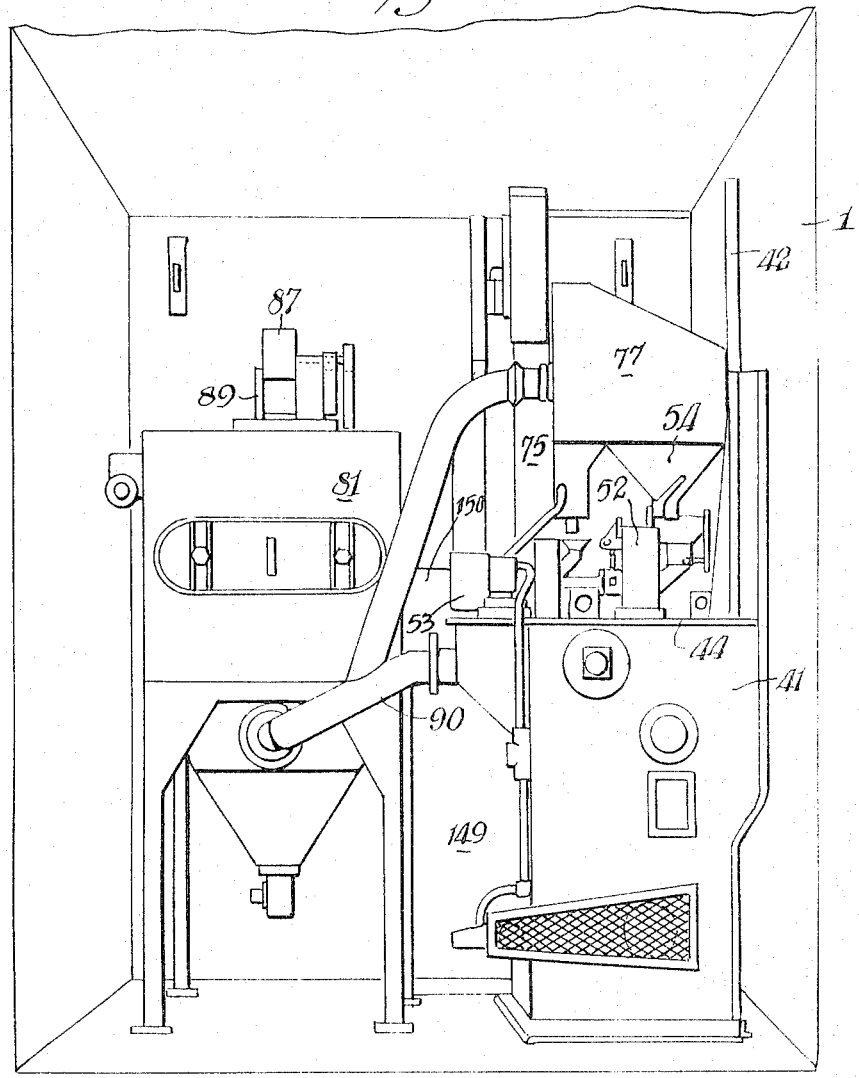
FIGURE 4 is an interior view of the housing taken from one side thereof.

As better seen in FIGURE 3, the lower portion or closed position portion of tracks 7 curves and extends inwardly from the upper portion or open position of the tracks 7. With this arrangement, a good tight seal is provided between door 5 and doorway 3 when the door is in the closed position.

Figure 2:
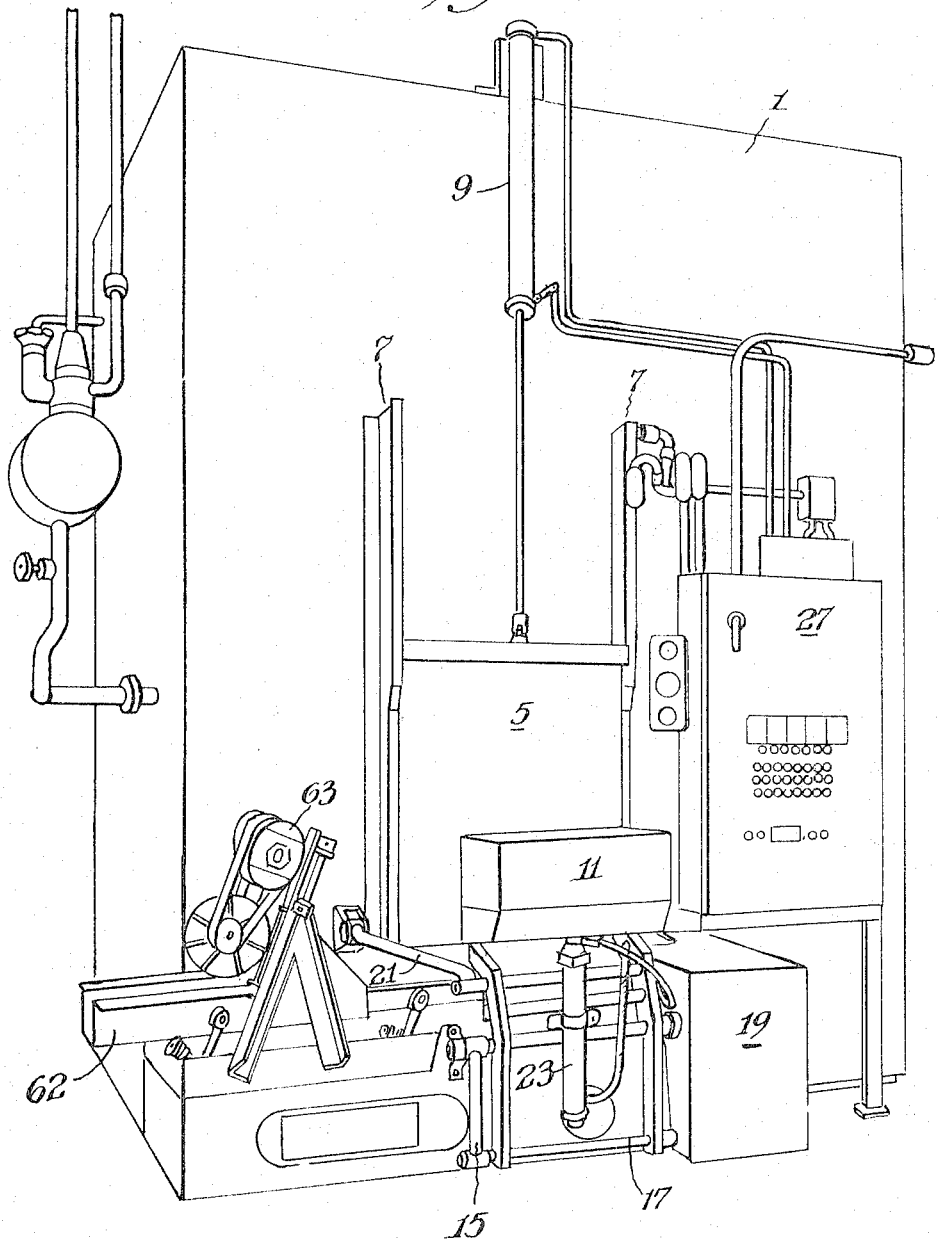
FIGURE 2 is a perspective of the apparatus of the present invention showing more particularly the front of the apparatus.

For loading and unloading the rubber pieces from a point externally of the housing 1, through the doorway 3 and into the freezing and abrasive treating area which will be described later, there is provided as better seen in FIGURES 1–3 a loading bucket 11 pivotally supported on arms 13 which are in turn pivotally supported on a bracket 15 mounted in fixed manner on drive shaft 17. Drive shaft control 19 rotates the shaft 17 to in turn raise the bracket 15, the bucket supporting arms 13 and the bucket 11 supported thereby to a position adjacent the top of the open doorway as seen in FIGURE 3. A side guide arm 21 pivotally connected to the housing 1 and an arm 13 guides or pulls the bucket 11 inwardly within the doorway 3. When the bucket is raised to this uppermost position, pressure cylinder 23 connected to the bucket support and the bottom of the bucket 11 is actuated to extend its shaft 25 connected with the bottom of the bucket to tip the bucket as shown in FIGURE 3 whereby the rubber pieces loaded in the bucket will be discharged into the freezing and abrasive treating area. After dischariging its load, the piston 25 is then retracted and the drive shaft 17 is rotated in the opposite direction to in turn lower the bracket 15, the arms 13 and the bucket 11 to its original station as shown in FIGS. 1 and 2. The door 5 opens automatically during the loading operation and is closed during the treating steps. Once the articles are deflashed and ready for unloading, the door 5 is automatically opend again.

The above operation of the bucket loader and door 5 is included as a part of a cycle which is automatically controlled through the control panel 27 affixed to the front face of the housing 1. The complete cycle will be explained later. The pressure cylinder can be solenoid operated.

Figure 5:
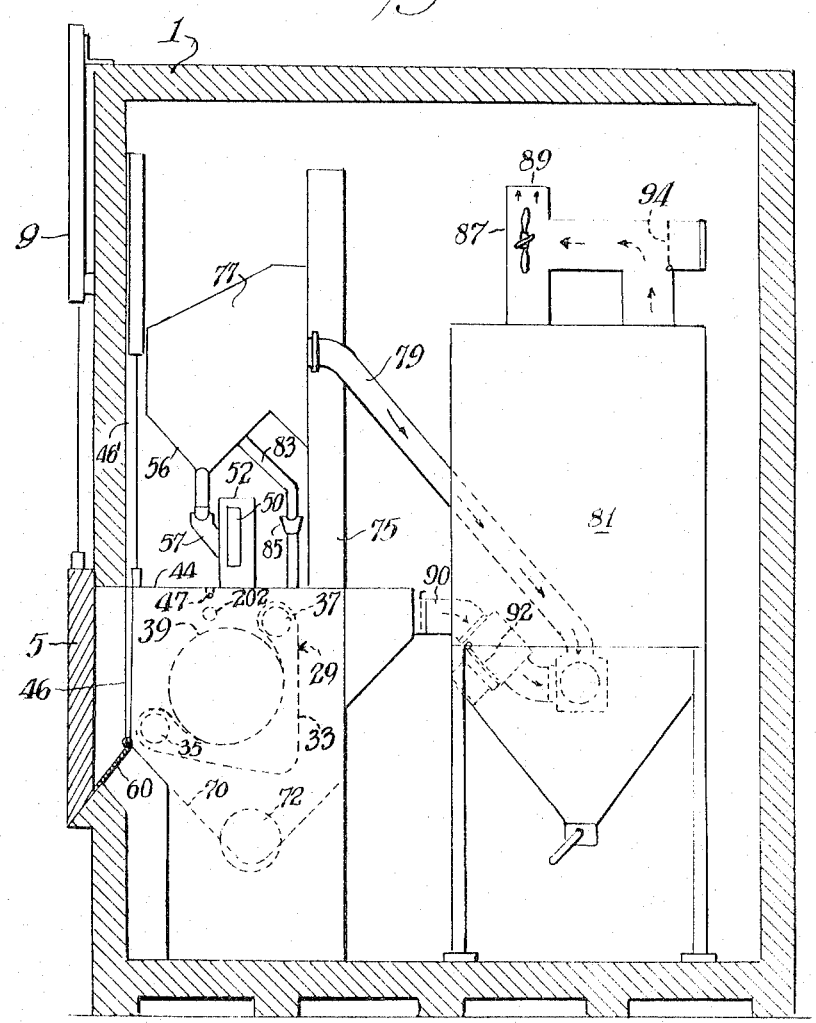
FIGURE 5 is a detail of the apparatus shown in FIGURES 1 through 4 taken from the opposite side to that of FIGURE 4.
Figure 6:
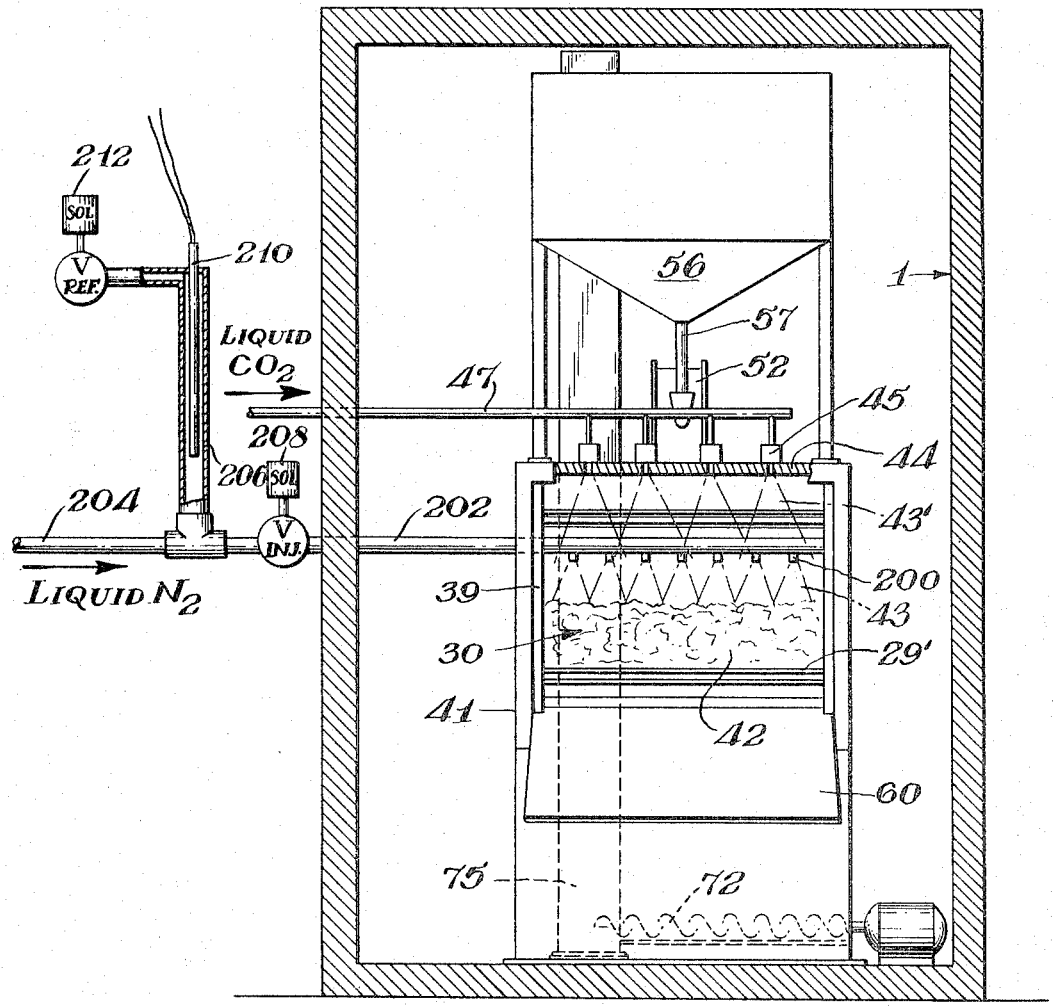
FIGURE 6 is a view on an enlarged scale of the trough shaped conveyor supported within the housing as well as the dual injection system for applying both liquid nitrogen and liquid $CO_2$ to the parts being deflashed.

The rubber pieces are received from loading bucket 11 by a trough shaped endless belt type conveyer 29 as shown better in FIGURE 5 (and especially FIGURE 6). The conveyer 29 is formed of metal bars or slats 29' which extend transversely of the conveyer travel and are connected at their ends to a continuous sprocket chain 33

(FIG. 5). The conveyer rotates around a front pair of guide sprockets 35 and a pair of rear drive sprockets 37 (FIG. 5). A pair of guide disks 39 are rotatably mounted in the side walls 41 of the chamber which enclose the sides of conveyer chamber 30 to provide contact with the slats of the upper deck of the conveyer 29 to compel the conveyer 29 to follow a concave path which resembles a trough lateraly inclined so that it faces the doorway 3. This conveyer-trough structure is better defined in the aforementioned Patent 3,110,983, particularly with reference to FIG. 6.

The operation of the conveyer 29 is part of the cycle controlled from the panel 27. The endless conveyer may also be formed of a wire mesh belt instead of the bars or slats. The conveyer chamber 30 also includes a door 46 (see FIG. 5) which is opened automatically through control panel 27 during the loading and unloading operation but which is closed during the freezing and abrasive treatment. Briefly, this door consists of an upper rigid portion having a lower flexible portion. The door 46 is supported by rollers in door tracks 46' which bend inwardly adjacent the bottom of the tracks. Since the lower portion of the door 46 is flexible, it follows the curved pathway defined by the lower curved portion of the tracks. The tracks 46' for the door 46 extend upwardly above the roof of the conveyer area to accommodate the door in its opened position. These structural details of the door are better shown in Patent No. 3,048,947; however, other suitable doors can be used.

After the rubber pieces 42 (see FIGURE 6) are loaded in the conveyer and before they are trimmed or deflashed, they are treated with a liquid nitrogen freezing medium 43 and a liquid carbon dioxide freezing medium 43'. The conveyer 29 is in operation during the freezing step whereby the pieces 42 are tumbled and turned to expose all surfaces to the freezing action.

The liquid carbon dioxide freezing medium used is supplied to the nozzles 45, which extend through the top of the chamber 30, by a common header 47 extending above the chamber 30.

Again, the application of the freezing medium 43 and 43' to the work pieces 42 occurs in a definitely timed cycle controlled by or through control panel 27.

As further shown in FIG. 6, liquid nitrogen is introduced into the chamber 30 through nozzles 200 connected with a common header 202. A nitrogen feed supply line 204 is connected with the header 202 through a stand pipe 206. The feed through the header 202 is controlled by a solenoid injection valve 208. A liquid level control 210 is provided for the stand pipe 206 and it controls a solenoid relief valve 212.

In operation, both the $CO_2$ and $N_2$ are applied simultaneously in a predetermined cycle, as will be explained.

In the freezing operation, the rubber pieces 42 are differentially frozen. This means that the excess trimming, flashing, etc. is frozen to a brittle state while the thicker portions of the rubber pieces are not completely frozen and therefore still retain some of their resiliency. With this arrangement, the brittle thin flashings are easily removed by the abrasive action whereas the thicker portions of the pieces are not damaged or otherwise abused by the abrasive action. The duration of the freezing step of the cycle will vary for different size or type of rubber pieces being treated.

After the rubber pieces have been differentially frozen in the manner explained above, they are then exposed to the next step of the cycle which is the abrasive treating cycle. As shown better in FIGS. 4 and 5 a rotary wheel 50 is supported in a housing 52 attached to the roof-top or wall 44 which joins the side walls 41 of the conveyer area to cover the top of the conveyer area. The wheel 50 is rotated at high speed by motor 53 to propel abrasive media such as fine steel shot through an opening in the roof top 44 and against the frozen rubber pieces supported in the trough shaped conveyer. The abrasive media is supplied to the blasting wheel 50 through storage bin 56 connected by passageway 57 to the wheel itself.

For further detailed description of the rotary blast wheel itself, reference is made, for instance, to Patents No. 2,869,289, 2,732,666 and 3,197,920 as well as copending patent application Serial No. 221,100 filed September 4, 1962, now abandoned. Any type of wheel assembly may be used however.

It should be noted, as mentioned above, that during both the freezing step and the abrasive action step, the sprockets 35 and 37 are driven by a suitable motor drive mounted externally of the side walls 41 which enclose the conveyer area. This action causes the rubber pieces to tumble, rotate and otherwise change position whereby all surfaces of the pieces 42 are adequately exposed or subjected to both the freezing and abrasive treatment.

After the abrasive action has ceased, both the outer door 5 and the inner door 46 are automatically raised to open position. The direction of travel of the conveyor 29 is reversed and as seen in FIGURES 5 and 6 the rubber pieces 42 drop onto a slide plate 60 from which point they slide outwardly thorugh the doorway 3 onto the unload conveyor 62 (see FIGURES 1 and 2). This slide plate 60 is automatically moved into position as shown in FIGURES 1, 5 and 6 when the unloading step of the cycle begins. After the rubber pieces are unloaded, the slide plate is then automatically retracted away from the conveyor 29 to permit the inner door 46 to close. This extension and retraction operation is controlled preferably by a carbon dioxide pressure cylinder operated through the control panel 27. The conveyor 62 is of the vibrating type driven by vibrator motor 63 attached thereto as shown in FIG. 3 and having a perforated top deck whereby any abrasive which is unloaded with the rubber pieces is shaken from the pieces. This abrasive drops through the perforations onto a solid plate positioned below. This type of conveyor is important in that the abrasive must be removed before the rubber pieces begin to thaw out. If such is not done, the pieces collect moisture as they thaw after which the abrasive cannot be removed from the pieces which causes undesirable rust spotting and loss of abrasive.

Any suitable vibrating conveyor can be used here as long as it follows the general structure indicated above.

The abrasive and trim or flash that has been removed from the rubber pieces 42 in the trough conveyor 29 drops through the slats 31 which make up the conveyor 29 and onto a screen slide or chute 70 (FIGURE 5) which permits only the abrasive and finer pieces of flashing to pass. This abrasive drops onto a screen conveyor (not shown) or other conveying means and is fed to a scalping drum 72 (see FIG. 5). In the scalping drum, the abrasive is further refined from the removed trim or flash with the flash discharged through the refuse discharge 74 (FIGURE 1) into a collection box 76 which can be removed and emptied by the user.

The specific structure of the scalping drum is described in Patents No. 2,771,189 and No. 3,087,615. From the scalping drum 72, the abrasive from which the larger pieces of trim or flash have been removed is passed into an elevator 75 which raises the abrasive upwardly to a separator 77 of an air wash type. The supply air for the separator is provided by the suction air being discharged from the dust collector which is described hereinafter. Here, the abrasive passes through a stream of air whereby the fins and other light-weight contamination are removed. The specific structure of the separator can be that shown in Patents No. 2,771,189, 3,087,615 and 3,227,327.

From the separator 77, the abrasive then passes down into the storage bin 56 for the abrasive from which it passes through conduit 57 to the abrasive wheel 50. The conduit 57 includes a suitable metering and purge gate assembly (not shown) for metering the abrasive to the wheel. This gate is disclosed and claimed in copending Patent No. 3,227,327. Briefly, it is formed of an element having a blade extending therefrom which meters the flow of abrasive. When jammed, an air cylinder operated directly by a depressable button from the control panel 27 rotates the element to move the blade out of jammed position. At the same time another blade on the element moves into metering position.

To further clean the abrasive, if necessary, a portion of the abrasive is branched off from the storage bin 56 through a feed pipe 83 to a shaker conveyor similar to the unload conveyor 62 described above wherein the abrasive passes through a screen onto a solid plate positioned below the screen from which point it is returned to the blast wheel 50 or storage bin 56.

From the separator 77, the moving air stream containing the contamination removed from the abrasive in the separator 77 passes through delivery pipe 79 into a dust collector or filter assembly 81.

The dust laden air stream is then filtered through a series of dust bags (not shown) with the air stream being drawn by the fan 87 mounted on top of the dust collector. The air is discharged through opening 89. Suitable dust collectors can be found in Patents Nos. 3,053,031; 2,667,233; 2,876,862; and 3,178,868.

Contaminated air is also fed to the dust collector 81 through line 90 leading off from the area adjacent the conveyor 29.

It should be pointed out that when loading and unloading occurs, the ventilation of the trough conveyor through line 90 is cut off by damper 92 located in line 90. This prevents drawing warm air from outside the housing into the cooled system. The damper 92 must be open during the blasting operation to provide ventilation. However, it is also closed during the liquid carbon dioxide and nitrogen application against the rubber work pieces 42 to prevent drawing the cooling air thus interfering with the freezing operation. The damper operation is controlled by a carbon dioxide valve which is incorporated into the operation cycle through control panel 27. When the damper 92 is closed, the air coming from the conveyor 29 area is by-passed to draw air from the housing interior in order to maintain a constant flow to the air separator 77. Damper 94 positioned atop dust collector 81 is also closed and by-passed to the housing interior in a timed cycle as will be explained later.

Flash freezing of rubber and plastic parts and the maintaining of the frozen flash during the heat generated by a blast cycle is accomplished by heavy flows of $CO_2$ and $N_2$ for short time intervals. Normally, when the warm parts are put into the deflashing machine, a fairly long heavy liquid injection in the order of 30 sec. to 1 min. is used to reduce the temperature of the entire load of work parts. When the flash is frozen, steel abrasive is projected at high velocity against the work to break off the flash. This mechanical work induces a heat build-up, so the blast is interrupted at regular intervals and very short bursts of liquid freezing medium are injected to counteract the heat of the blast operation.

The various mecahnisms described above throughout the application are preferably operated by carbon dioxide valves wherever possible. These valves are connected with the control panel to operate in a timed cycle.

The cyclic operation of the assembly described above is as follows:

(1) Doors closed—machine shut down;

(2) Press cycle start button (panel 27);

(3) Abrasive system starts and remains running for successive cycles; abrasive recirculating "starts";

(4) Room and conveyor (5, 46) doors "open," exhauster (90) stops (if running); work conveyor reverses to unload; damper (92) by-passes to room, collector shaker (62) "starts"; damper 94 closes; after 5 seconds, collector shaker (62) "stops";

(5) Work conveyor (29) forward—loader "up and down"; approximately 10 seconds;

(6) Room and conveyor (5, 46) doors close, damper (94) opens, exhaust (90) starts;

(7) Primary freeze on, holds damper 92 by-pass to room;

(8) Blast wheel (50) starts (no abrasive yet);

(9) Primary freeze off, blast on; abrasive recirculating stops; damper (92) returns to normal;

(10) Each secondary freeze, damper 92 by-passes to room; blast off each time;

(11) Blast timer times out—blast shuts "off"; abrasive recirculating starts;

(12) After 60 seconds for draining abrasive from load, work conveyor stops and cycle ends;

(13) Abrasive system and exhauster (90) remain running, abrasive recirculating operating; dampers (92 and 94) in normal posititon;

(14) To repeat cycle, press cycle start button and sequence repeats from #4 above;

(15) Damper gate 92 when operated to by-pass, disconnects conveyor (29) ventilation from exhaust separator-ventilation remains on;

(16) Damper gate 94 when operated disconnects exhauster from unload shaker (62) separator (77) and conveyer (29);

(17) Damper gate 92 operates to by-pass whenever doors are open or freeze is turned on; and

(18) Damper gate 94 closes whenever load doors are open.

Obviously many modifications and variations of the present invention are possible in the light of the above teachings. It is, therefore, to be understood that within the scope of the appended claims the invention may be practiced otherwise than as specifically described.

What is claimed is:

1. Apparatus for deflashing molded resilient pieces comprising a dehumidifying housing, means supported within the housing for simultaneously supporting and turning said molded pieces having flashing, a first freezing medium applicator means within said housing, a second freezing medium applicator within said housing, said applicators being adjacent said piece supporting and turning means for applying freezing medium to said pieces to lower the temperature of said molded pieces, abrasive blasting means supported within said housing adjacent said piece supporting and turning means for propelling abrasive against said cooled work pieces to remove the flashing therefrom, means adjacent the molded piece supporting and turning means for collecting the used abrasive and the removed flashing, means for separating the removed flashing from said used abrasive, means for conveying the separated used abrasive to a point for reuse by the blasting means, the first freezing medium applicator being a liquid carbon dioxide applicator, the second freezing medium applicator being a liquid nitrogen applicator, said liquid nitrogen applicator comprising a header nozzle leading off therefrom, a valve being in said header nozzle to control the feed of liquid nitrogen therethrough, a supply line for feeding liquid nitrogen to said header nozzle, a stand pipe connection connecting said supply line and said header nozzle, and liquid level control means for said stand pipe.

2. The apparatus of claim 1 wherein a relief valve is connected with said stand pipe.

3. Apparatus for deflashing molded resilient pieces comprising a dehumidifying housing, means supported within the housing for simultaneously supporting and turning said molded pieces having flashing, a first freezing medium applicator means within said housing, a second freezing medium applicator within said housing, said applicator being adjacent said piece supporting and turning means for applying freezing medium to said pieces to lower the temperature of said molded pieces, abrasive blasting means supported within said housing adjacent said piece supporting and turning means for propelling abrasive against said cooled work pieces to remove the flashing therefrom, means adjacent the molded piece supporting and turning means for collecting the used abrasive and the removed flashing, means for separating the removed flashing from said used abrasive, and means for conveying the separated used abrasive to a point for reuse by the blasting means, a dust collector positioned within said housing, ventilating means leading off from said molded piece supporting and turning means which ventilating means is connected with said dust collector, means within said ventilating means for temporarily closing off said ventilating means from said dust collector, an air wash separator being provided within said housing for separating finer contamination from the used abrasive, a ventilator leading off from said air wash separator and being connected to said dust collector, said second freezing medium applicator comprising a header nozzle leading off therefrom, a valve in said header nozzle to control the feed of freezing medium therethrough, a supply line for feeding said freezing medium to said header nozzle, a stand pipe connection connecting said supply line and said header nozzle, and liquid level control means for said stand pipe.

4. The apparatus of claim 1 wherein said piece supporting and turning means is an endless belt type conveyor assembly formed of spaced and transversely extending slats, the rear support for the belt being rotatably supported at a point higher than the front rotatable belt support, side and top walls enclosing said belt, rotatable end discs supported in the side walls which are urged against the top flight of said belt to form a trough in the belt, a vertically moving door provided for the loading and unloading end of said belt which door fits close against the side and top walls when lowered in position, and the means for applying a freezing medium is so positioned to apply said medium against the top flight of said belt.

5. The apparatus of claim 4 wherein a retractible slide plate is supported in front of said lower rotatable support for said belt, and control means are provided for moving the plate into position adjacent the belt when the belt travel is reversed for unloading the pieces.

6. The apparatus of claim 1 wherein said housing contains a doorway, a vertically movable door in said doorway, a work piece bucket loader supported externally of said housing adjacent said doorway, vertically reciprocating support means for said bucket loader, and reciprocating means connected with said bucket loader and support for tipping said bucket, said support and tipping means cooperating to move the bucket loader into and through the housing doorway to a discharge position above said piece supporting and turning means.

7. The apparatus of claim 1 wherein refrigerating means are porvided in said housing for cooling the area enclosed thereby.

8. The apparatus of claim 1 wherein a remote control device is provided for operating various of said means in a timed cycle.

9. The apparatus of claim 6 wherein a vibrating conveyor-separator means is provided externally of the housing doorway for receiving the pieces discharged from the housing for separating abrasive from the pieces and to convey the pieces to a collection point.

10. The apparatus of claim 6 wherein a purge gate is provided adjacent said blasting means to release any jammed abrasive being fed to the blasting means.

References Cited by the Examiner

UNITED STATES PATENTS

| 2,533,653 | 12/1950 | Winkeljohn | 51—164 X |
| 2,682,732 | 7/1954 | Hanrahan et al. | 51—13 X |
| 2,881,571 | 4/1959 | Granata | 51—314 X |
| 2,996,846 | 8/1961 | Leliaert | 51—13 |
| 3,110,983 | 11/1963 | Moore | 51—13 X |
| 3,137,101 | 6/1964 | Leliaert | 51—13 |
| 3,160,993 | 12/1964 | McCormick | 51—13 X |

FOREIGN PATENTS 823,101 11/1957 Great Britain.

LESTER M. SWINGLE, *Primary Examiner.*